United States Patent [19]

Salvi et al.

[11] 3,757,203
[45] Sept. 4, 1973

[54] MAGNETOMETER FOR DETECTION AND IDENTIFICATION OF IMMERSED BODIES

[75] Inventors: Antoine Salvi, Fontaine; Guy Chiron, Saint-Martin D'Heres, both of France

[73] Assignee: Commissariat A L'Energie Atomique, Paris, France

[22] Filed: Sept. 21, 1971

[21] Appl. No.: 182,473

[52] U.S. Cl. .................. 324/4, 324/0.5 R, 324/3, 324/8, 324/43 R
[51] Int. Cl. .................. G01v 3/16, G01r 33/22
[58] Field of Search ............... 324/3, 4, 6, 8, 43 R, 324/43 G, 0.5

[56] References Cited
UNITED STATES PATENTS

| | | | |
|---|---|---|---|
| 2,426,622 | 9/1947 | Laird et al. | 324/43 R |
| 2,900,595 | 8/1959 | Mengel et al. | 324/43 R X |
| 3,257,608 | 6/1966 | Bell et al. | 324/43 R X |
| 3,398,360 | 8/1968 | Behr et al. | 324/43 |

Primary Examiner—Gerald R. Strecker
Attorney—William D. Stokes

[57] ABSTRACT

A device for use with a differential magnetometer which is carried or towed by an aircraft is intended to determine whether a signal indicates the presence of a wreck or sub marine. The device comprises several bandpass filters whose frequencies are so selected that one of the filters provides an output higher than that of any filter outside a pre-determined frequency range which corresponds to the frequency spectrum of a typical body for a pre-determined speed of the aircraft, if such a body is present.

8 Claims, 18 Drawing Figures

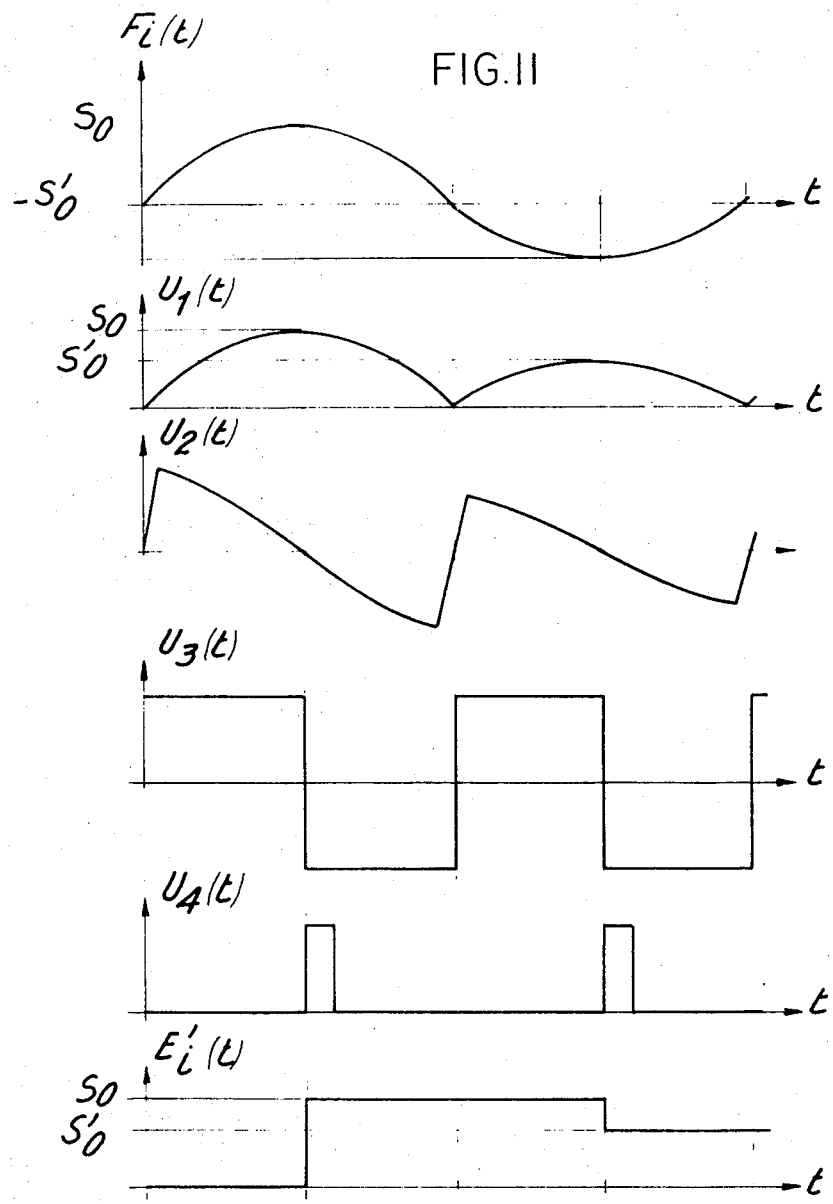
FIG.II

FIG. 18

MAGNETOMETER FOR DETECTION AND IDENTIFICATION OF IMMERSED BODIES

BACKGROUND OF THE INVENTION

The invention relates to the detection and identification of immersed magnetic bodies, particularly underwater wrecks and submarines.

Previous methods of detection of immersed ferromagnetic bodies using a high sensitivity magnetometer carried on board an aeroplane flying over the sea, have given information of the nature of the objects based upon the perturbations to the earth's magnetic field caused by the submerged magnetic body. The sensitivity of such prior art detection methods is low and decreases when the distance between the aeroplane and the immersed ferro-magnetic body increases. Furthermore, as we shall see hereinafter, local perturbations of the earth's magnetic field may be of different origins, so that the overall response of the magnetometer is difficult to interpret.

Another prior art method of magnetic anomaly surveying makes use of a magnetometer system for measuring the total magnetic field intensity and the vertical gradient to determine the depth and fall-off rate of subterranean magnetic disturbances. The two simultaneous measurements required for carrying out the method constitute a definite drawback which makes it unsuitable for the above mentioned purpose.

SUMMARY OF THE INVENTION

It is an object of the invention to provide a detection and identification device which provides reliable indications while remaining simple. It is a more particular object of the invention to provide a device having a low probability of error due to its selectivity.

For this purpose the device according to the invention for detecting the presence of an underwater wreck processes a signal from a differential high sensitivity magnetometer (preferably a nuclear magnetic resonance magnetometer) which detects anomalies in the magnetic field, said magnetometer being carried by an aeroplane flying at a velocity V and at an altitude above the water between predetermined limits $h_1$ and $h_2$. The device comprises, in combination :

N band-pass filters (N being an integer) dividing a frequency band $f_o - f'_o$ into sub-bands in dependence on the limits $h_1$ and $h_2$ and the velocity V, one filter covering a range of frequencies below $f_o$ and the other filter covering a range of frequencies higher than $f'_o$, N stages for detecting the envelopes of the signals provided by each filter, N stages for detecting the maxima of each of the aforementioned envelopes, one stage for comparing said maxima and detecting the greatest maximum, and a decision stage indicating a high probability that an underwater wreck or submarine is present as a result of the largest maximum being in the frequency band $f_o - f'_o$.

DESCRIPTION OF THE DRAWINGS

FIG. 11 shows the shape of the various signals obtained in the stage in FIG. 10 ;

FIG. 18 shows a complete electronic system, in the form of functional sub-units, provided with the improvements according to the invention.

DESCRIPTION OF THE PREFERRED EMBODIMENT

Theoretical considerations

For a better understanding of the invention some theoretical considerations will first be expounded with reference to FIGS. 1 – 4.

Figure 1:
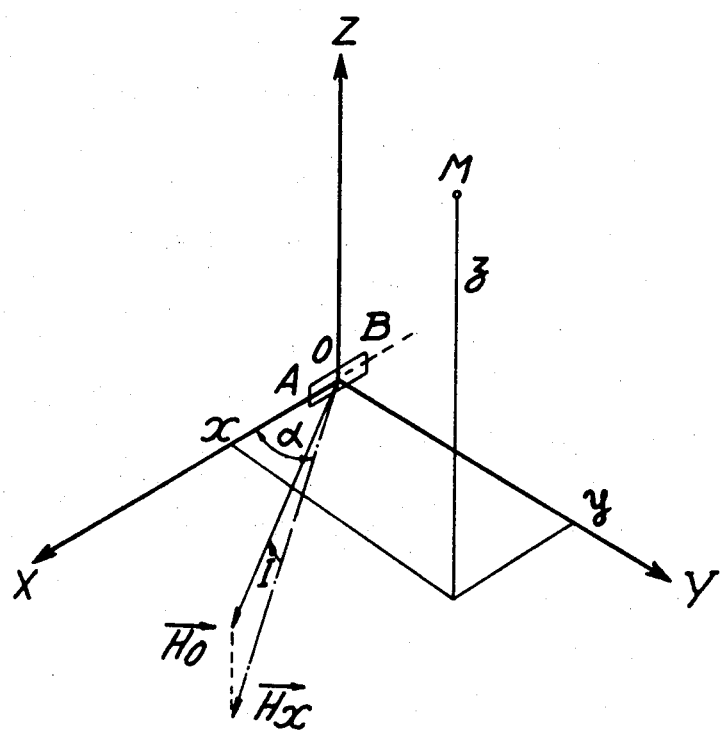
FIGS. 1 to 4 respectively illustrate the coordinates of the measuring device with respect to a magnetic dipole, the magnetic field produced by the dipole, and the signals output by the measuring device for trajectories C and D in FIG. 2.

The rectangular coordinate system of FIG. 1 has its origin 0 at the center of a ferro-magnetic object such as a wreck or a sub lying on the bottom of the sea and which may be considered as a horizontal magnetic dipole AB. The axis Ox is along AB, the axis Oy is horizontal and perpendicular to AB, and axis Oz is vertical, the unit of length being half the length of AB. Let x, y and z be the coordinates of the measuring point M, i.e. of the magnetometer in the aeroplane ; let I be the angle of inclination of the earth's magnetic field $\vec{H_o}$ with respect to a horizontal plane, and let $\alpha$ be the angle between Ox and the projection $\vec{H_x}$ of $\vec{H_o}$ on the plane xOy.

The magnetic fields $\vec{h_a}$ and $\vec{h_b}$ respectively produced at M by the magnetic pole A, assumed to be positive, and the magnetic pole B, assumed to be negative are :

$$\vec{h_a} = K\,(\vec{a}/a^3) \qquad \vec{h_b} = -K\,(\vec{b}/b^3)$$

$\vec{a}$ and $\vec{b}$ respectively being the vectors $\overrightarrow{AM}$ and $\overrightarrow{BM}$ (not shown in FIG. 1), a and b being the lengths of the vectors and K being a constant.

The disturbance $\overrightarrow{\Delta H}$ of the earth's magnetic field by dipole AB is:

$$\overrightarrow{\Delta H} = \overrightarrow{h_a} + \overrightarrow{h_b}$$

Usually, this disturbance is very slight i.e., $|\overrightarrow{\Delta H}| \ll |9\overrightarrow{H_o}|$. We can therefore assume that it affects only the modulus of the earth's field and not its direction, so that we can write:

$$|\overrightarrow{\Delta H}| \cong |\overrightarrow{H_o}(\overrightarrow{h_a} + \overrightarrow{h_b})/H_o^2 \cdot \overrightarrow{H_o}|$$

Allowing for the chosen coordinates, we have:

$\overrightarrow{H_o} \cdot \overrightarrow{h_a} = KH_o/a^3 [\cos I \cdot \cos \alpha \cdot (x-1) + \cos I \cdot \sin \alpha \cdot y + \sin I \cdot z]$ $\overrightarrow{H_o} \cdot \overrightarrow{h_b} = -KH_o/b^3 [\cos I \cdot \cos \alpha \cdot (x+1) + \cos I \cdot \sin \alpha \cdot y + \sin I \cdot z]$ from which we deduce that:

$$\Delta H = 2K \cdot f(x, y, z, I, \alpha)$$

with $f(x,y,z,I,\alpha) = (x \cos I \cos \alpha + y \cos I \sin \alpha + z \sin I)(a^{-3} - b^{-3}) - \cos I \cos \alpha \cdot (a^{-3} + b^{-3})$ and $$a^2 = (x-1)^2 + y^2 + z^2 \quad b^2 = (x+1)^2 + y^2 + z^2$$

since the constant K depends only on the dipole.

This reasoning shows that lines of equal disturbance can be drawn in horizontal planes if the dipole is assumed to be stationary.

Figure 2:
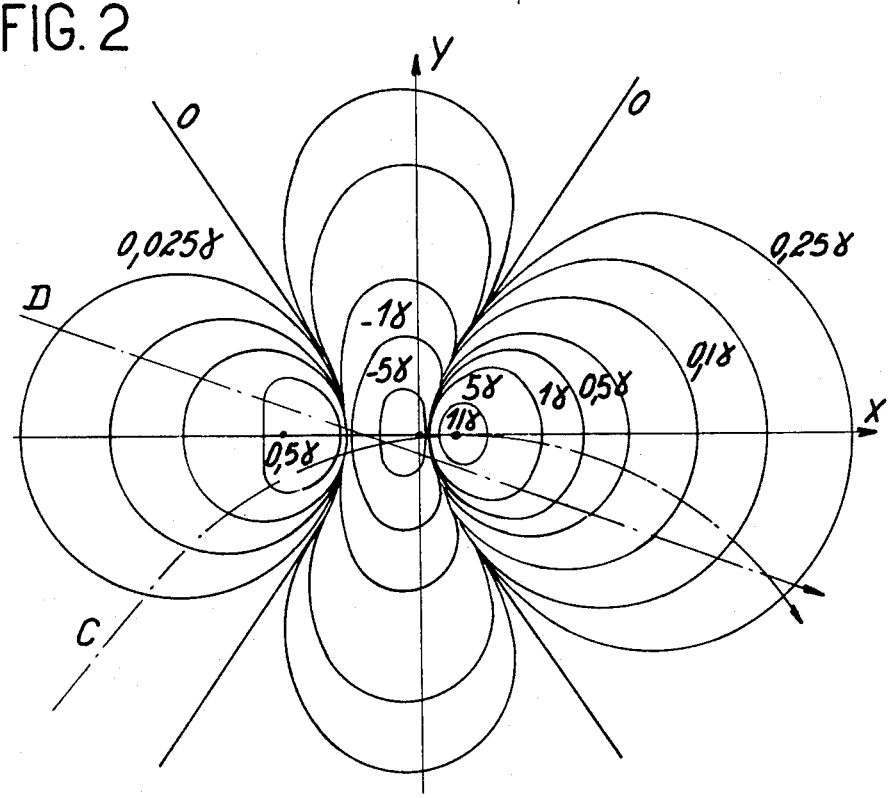

As an example, FIG. 2 shows lines of equal disturbance $\Delta H$ for an altitude $z$ of 100 m, a dip I of 45° and a dipole 100 m long, oriented south-north ($\alpha = 0°$) and magnetised so that it produces a magnetic field of $10^4$ $\gamma$ at 10 m. The curves are graduated in gammas (one gamma = $10^{-5}$ oersted).

Figure 3:
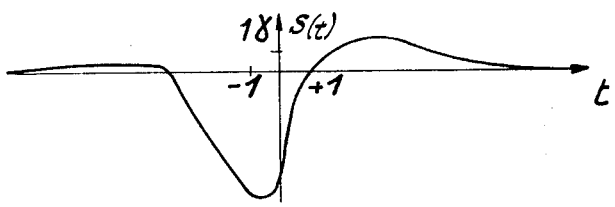
Figure 4:
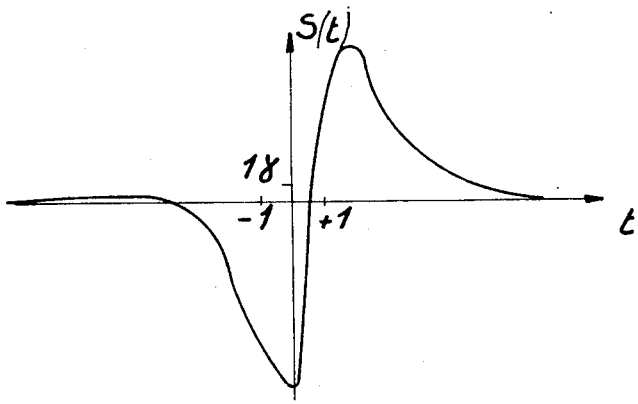

FIG. 2 likewise shows (in dash-dot lines) a rectilinear aeroplane path D and a part circular path C forming an arc of a circle. Since the speed of the aeroplane is known it is easy to draw a curve showing the variation with time of the magnetometer output signal $S(t)$: The curves for the trajectories C and D are shown in FIGS. 3 and 4 respectively. It appears from a consideration of the signals $S(t)$ at different heights and different trajectories that the shape and amplitude of the curves are very variable, but also that the resulting signals as a first approximation have ½, 1 or 1½ half-waves.

In order to process the information given by the signals $S(t)$, limits should be selected for the measuring condidions, i.e., for the conditions under which underwater bodies may be considered as magnetic dipoles for detection purposes.

In an embodiment the following limits were selected: the aeroplane flies over the magnetic dipole at a height between 100 and 400 m and at a speed of about 100 m/s, the diametral range over which a signal may be obtained being between 320 and 1350 m. Under these conditions, the time $\tau$ during which the magnetometer travels through the disturbance is between 3.2 and 13.5 seconds; depending on the shape of $S(t)$, the dominant frequency $f_M$ of its spectrum $S(f)$ is between $1/2\tau$ and $3/2\tau$, i.e., in the present embodiment we have:

$$0.037 \text{ cps} \leq f_m \leq 0.47 \text{ cps}$$

In the invention, the above reasoning relating to the spectrum $S(f)$ of the signal $S(t)$ is used mainly to identify the nature of the phenomenon causing the perturbation of the earth's field. In the following it will be assumed that the magnetometer has a background noise such that the minimum amplitude of a disturbance which can be measured is about 0.1 $\gamma$. As will be shown, a list can be made of the phenomena which may be recorded by the magnetometer, and it can be shown that only a few of these phenomena give rise to signals having the same characteristics as those given by an underwater magnetic body.

The main phenomena causing perturbations to the earth's magnetic field are the following: variations in the earth's magnetic field itself, magnetic rocky bodies, action of waves, action of banks or shores, kinematic relativity, magnetism of the carrying aircraft, and magnetism of the detector.

a. The variations with time of the earth's magnetic field are of three kinds:

Firstly, daily variations, which may be of high amplitude, up to $\pm 25\gamma$; calculations show that, in the most unfavourable case, the dominant frequency $f_M$ of the spectrum $S(f)$ of the signals $S(t)$ produced by these variations is of the order of 0.02 Hz; this frequency is therefore outside the relevant band;

Secondly, rapid variations due to earth currents. These are of low amplitude, less than one-tenth of a gamma;

Finally, magnetic storms can give signals having the same characteristics as the relevant signals, but such storms are rare.

b If the magnetic rocky masses have small dimensions the signals they produce are of low amplitude, whereas if they are large, the signals produced have a dominant frequency $f_M$ which is low and therefore does not interfere.

c The movement of waves induces currents in the earth's magnetic field $H_o$ and thus perturbs it. Research by FRASER has shown that these perturbations add a field of small amplitude $h = h_o \sin 2\pi f_o t$ to $H_o$. The additional field moves in the same direction and at the same speed as the wave. At a distance of 40 m from the surface of the sea, ordinary waves give $h_o \leq 0.3$ $\gamma$ and $f_o \simeq 0.08$ Hz; rollers give $h_o \leq 0.6\gamma$ and $f_o \simeq 0.08$ Hz; and a calm sea gives $h_o < 0.1$ $\gamma$ while $f_o$ may be very variable. Since the magnetometer is moving and the speed of the aeroplane is large compared with that of the waves, the dominant frequency $f_M$ due to the waves may be of any value and may inter alia be in the relevant band. The waves can therefore give interfering signals.

d. The effect of banks or shores is not fully understood and explored.

e. The kinematic relativity effect depends on the nature of the magnetometer in the system according to the invention. The magnetometer is preferably of the nuclear magnetic resonance type using the Overhauser-Abragam effect although an optical pumping magnetometer may also be used. The magnetometer may inter alia be of the type described in the French Pat. No. 1 430 874, French patent of Addition No. 88 663, French Pat. Nos. 1 485 556, 1 500 971 and 1 521 587, and French Addition No. 94 075 of Commissariat a l'Energie Atomique, assignee of the present invention. In the aforementioned magnetometer, the measurement of a magnetic field is reduced to the measurement of the nuclear spin precession frequency $f_o = \gamma^o/2\pi H_o$ ($\gamma_o$ here being the gyromagnetic ratio of the nuclear spin).

If the detector rotates, its angular speed of rotation $\omega$ (equal to that of the aeroplane) is algebraically added to $\omega_o = 2\pi f_o = \gamma_o H_o$. The magnetometer therefore measures a total pulsation such that :

$$\Omega = \omega_o + \omega = \gamma_o H_o + \gamma_o H_o (\omega/\omega_o)$$

i.e., the effect is the same as if a field $H_o \omega/\omega_o$ was added to the earth's field $H_o$.

A complete study shows that the resulting spectrum is of little concern. In addition the effect may be compensated at least partially.

f. The magnetism of the aircraft, of its pay load and of its electric equipment may be reduced until its amplitude is undetectable.

g. The magnetism of a good quality detector is negligible.

It can be seen therefore that only waves and magnetic storms can really give signals having the same characteristics as those given by an underwater dipole.

Hardware :

The detection system uses the harmonic analysis of signals delivered by the magnetometer for determining the frequency at which the signal spectrum has a maximum. If the frequency is in the 0.037 cps — 0.47 cps band, it is highly probable that the signal corresponds to a submerged body of the relevant kind (wreck or submarine). The device therefore comprises two main sub-assemblies, one for obtaining the spectrum of the signal, and the other for determining the frequency at which the spectrum is at a maximum.

The spectrum is provided by band-pass filters which divide the relevant frequency band into sub-bands. Such filters have a gain $T_i(f)$ having a finite value $G$ for frequencies in the pass-band, i.e., between $f_i - \Delta f_i$ and $f_i + \Delta f_i$, and a gain which is substantially zero for frequencies outside the band.

If $F_i(t)$ is the signal obtained at the output of a filter at whose input the signal $S(t)$ is applied, the value of the signal $F_i(t)$ is :

$$F_i(t) = \int_0^\infty S(f) \cdot T_i(f) \exp\cdot (-2\pi j \cdot ft) df$$

$S(f)$ being the spectrum of the signal $S(t)$.

If the filter band width $2 \Delta f_i$ is small enough, $S(f)$ can be considered constant in this band ; in that case :

$$F_i(t) = S(f_i) \cdot G_i \int_{f_i - \Delta f_i}^{f_i + \Delta f_i} e^{-2\pi j \cdot ft} df$$

therefore :

$$F_i(t) = 2 \Delta f_i \cdot G_i \cdot S(f_i) \sin 2\pi\Delta f_i t/2 \pi\Delta f_i t \, e^{-2\pi j \cdot f_i t}$$

Consequently, $F_i(t)$ is a sinusoidal signal of frequency $f_i$ modulated by the function $(\sin 2\pi\Delta f_i t)/2\pi\Delta f_i t$ ; its amplitude is proportional to the sample $S(f_i)$ of the spectrum of the signal $S(t)$.

In order to determine the frequency at which the aforementioned spectrum is at a maximum, the outputs of the filters are connected to means for detecting the envelopes $E_i(t)$ of the signals $F_i(t)$ and the maxima $V_i$ of these envelopes. A decision unit determines which of the voltages $V_i$ is largest and whether the frequency of the maximum voltage is in the relevant band or not.

As indicated above, the signal $F_i(t)$ from a filter is a sinusoidal signal which is a function of the variable $f_i t$ modulated by a function of the variable $2 \Delta f_i t$. The signal $F_i(t)$ will have the same form, whatever the filter, if the ratio $Q$ between the aforementioned variables (sharpness of the filter) is constant, irrespective of the filter :

$$Q = f_i / 2 \Delta f_i$$

If the sharpness is the same for all filters, it is possible (i) to use the same circuit for each filter and (ii) to have the same circuits for the means processing the signals $F_i(t)$, since all the signals $F_i(t)$ are of the same shape.

For simplicity and low cost, the number N of filters should be as small as possible. To this end, the filters used have pass-bands which are exactly adjacent, as shown by the relation $$f_i + \Delta f_i = f_{i+1} - \Delta f_{i+1}$$

The frequency $f_M$ at which the spectrum $S(f)$ of the signal $S(t)$ is at a maximum is in the pass-band of a filter of central frequency $f_a$ outputting a voltage $V_a$ which is the largest among the voltages $V_i$. In order to decide whether the frequency $f_M$ corresponds to a maximum of the spectrum $S(f)$ in the relevant band between two frequencies which will be called $(f_M)_{min}$ and $(f_M)_{max}$, it is necessary to make sure that there is no voltage $V_i$ higher than $V_a$ outside the band ; a filter is therefore needed which has a central frequency smaller than $(f_M)_{min}$ — i.e., the filter of order 1 - and another filter is required having a central frequency higher than $(f_M)_{max}$ — i.e., the filter of order N.

Using the last selected relation $f_i + \Delta f_i = f_{i+1} - \Delta f_{i+1}$ we can therefore write :

$$f_1 + \Delta f_1 = (f_M)_{min} = f_2 - \Delta f_2, \text{ and}$$

$$f_N - \Delta f_N = (f_M)_{max} = f_{N-1} + \Delta f_{N-1}$$

These equations and the relation $f_i/2 \Delta f_i = Q$ can be used to calculate $N$, since:

$$\left. \begin{array}{l} (f_M)_{min} = f_2 - \Delta f_2 \\ f_2 + \Delta f_2 = f_3 - \Delta f_3 \\ f_3 + \Delta f_3 = f_4 - \Delta f_4 \\ \vdots \\ f_{N-1} - \Delta f_{N-1} = (f_M)_{max} \end{array} \right\} \quad (I)$$

Now $\Delta f_i = f_i/2Q$ implies that $f_i + \Delta f_i = f_i (1 + 1/2Q)$ If all the terms on the left of (I) are multiplied by each other, one obtains:

$$(f_M)_{min} \cdot f_2 \cdot f_3 \ldots f_i \ldots f_{N-1} \cdot (1 + 1/2Q) \exp(N-2) = f_2 \cdot f_3 \ldots f_i \ldots (f_M)_{max} \cdot (1 - 1/2Q)^{N-2}$$

which implies that:

$$(f_M)_{min} \cdot (1 + 1/2Q)^{N-2}$$

Therefore:

$$[1 + (1/2Q)/1 - (1/2Q)]^{N-2} = (f_M)_{max}/(f_M)_{min}$$

and:

$$N - 2 = \frac{\text{Log} \frac{(f_M)_{max}}{(f_M)_{min}}}{\text{Log} \frac{2Q+1}{2Q-1}} \quad \text{Therefore } N = 2 + \frac{\text{Log} \frac{(f_M)_{max}}{(f_M)_{min}}}{\text{Log} \frac{2Q+1}{2Q-1}}$$

It has been found experimentally that satisfactory results are obtained if $Q = 2.5$ and consequently $N = 8$. Under these conditions, the cut-off frequencies of the eight filters are the following in cps:

$f_1 = 0.031$
$f_2 = 0.048$
$f_3 = 0.072$
$f_4 = 0.108$
$f_5 = 0.162$
$f_6 = 0.25$
$f_7 = 0.39$
$f_8 = 0.59$

Figure 5:
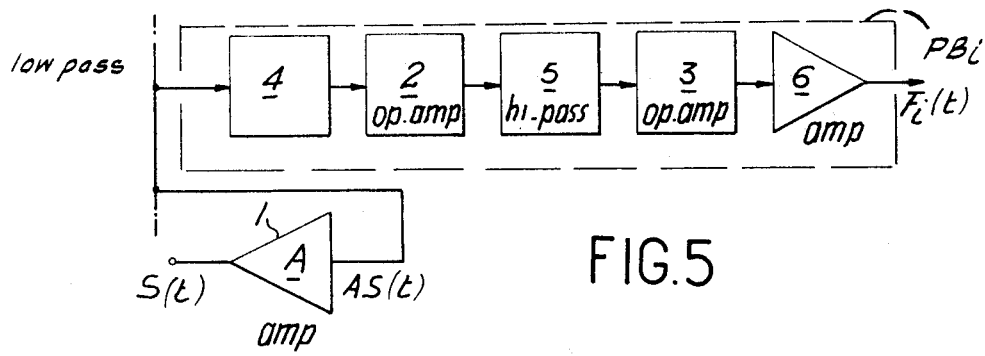
FIG. 5 is a block diagram in the form of functional sub-units of a filter stage comprising a low-pass and a high-pass filter.

Reference will now be had to FIG. 5, which illustrates one of the eight filters following a magnetometer (not shown) which will be assumed to be a nuclear magnetic resonance magnetometer. The low amplitude signal $S(t)$ delivered by the magnetometer is amplified by an amplifier 1 of gain A. The amplified signal $AS(t)$ is applied in parallel to the input of the eight filters, one of which (filter $PB_i$) will be described by way of example.

The sampling makes it necessary to select filters which each have a frequency-dependent gain curve which is as square as possible, i.e., which has sides which are steep in absolute value and does not have resonances giving spiky gain curves.

One method of obtaining steep sides is to use a pair of active filters 2, 3 each comprising a high-gain continuous amplifier (usually called an operational amplifier) having a reaction loop comprising resistors and capacitors; to avoid resonances, a low-pass filter 4 having a cut-off frequency $f_H$ is connected in series with a high-pass filter 5 having a cut-off frequency $f_B$ being eliminated in known manner by resistance-capacitance or RC cells forming part of the filters.

An amplifier 6 having an adjustable gain $k_i$ is used to provide signals of equal amplitude at the outputs of eight filters such as $PB_i$ in parallel.

Figure 6:
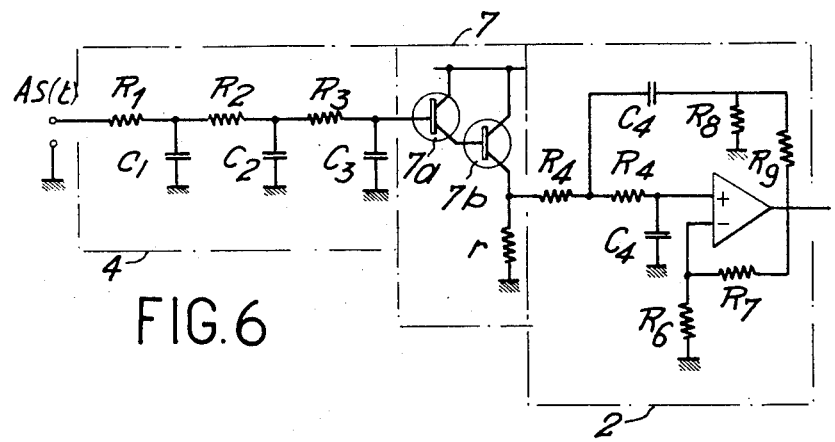
FIG. 6 diagrammatically shows the low-pass filter in FIG. 5.
Figure 7:
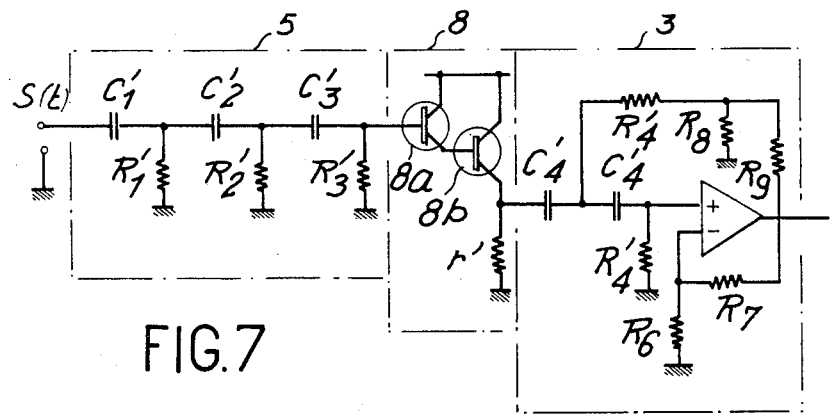
FIG. 7 diagrammatically shows an embodiment of the high-pass filter in FIG. 5.

Referring to FIGS. 6 and 7, respectively, there are shown a low-pass filter 4 and a high-pass filter 5 forming part of the pass-band filter $PB_i$. The active filters 2, 3 are separated from the corresponding RC cells by impedance matching circuits 7, 8 each made up of two transistors $7a$–$7b$, $8a$–$8b$ connected in cascade as emitter-followers.

The transfer function of the low-pass filter can be calculated as follows:

output/input $= G_o [1 + 5p/(1+\tau_1 p)(1+\tau_2 p)(1+\tau_3 p)(1+2\xi\tau_4 p + \tau_4^2 p^2)]$ In the last mentioned formula, referring to FIG. 6:

$p = j\omega$
$\tau_1 = R_1 C_1 ; \tau_2 = R_2 C_2 ; \tau_3 = R_3 C_3$ $1/(1+\tau_1 p)(1+\tau_2 p)(1+\tau_3 p)$ is the transfer function of the RC cells.

$G_o = R_6 + R_7/R_6$ is the gain in the low-frequency pass region.

Figure 8:
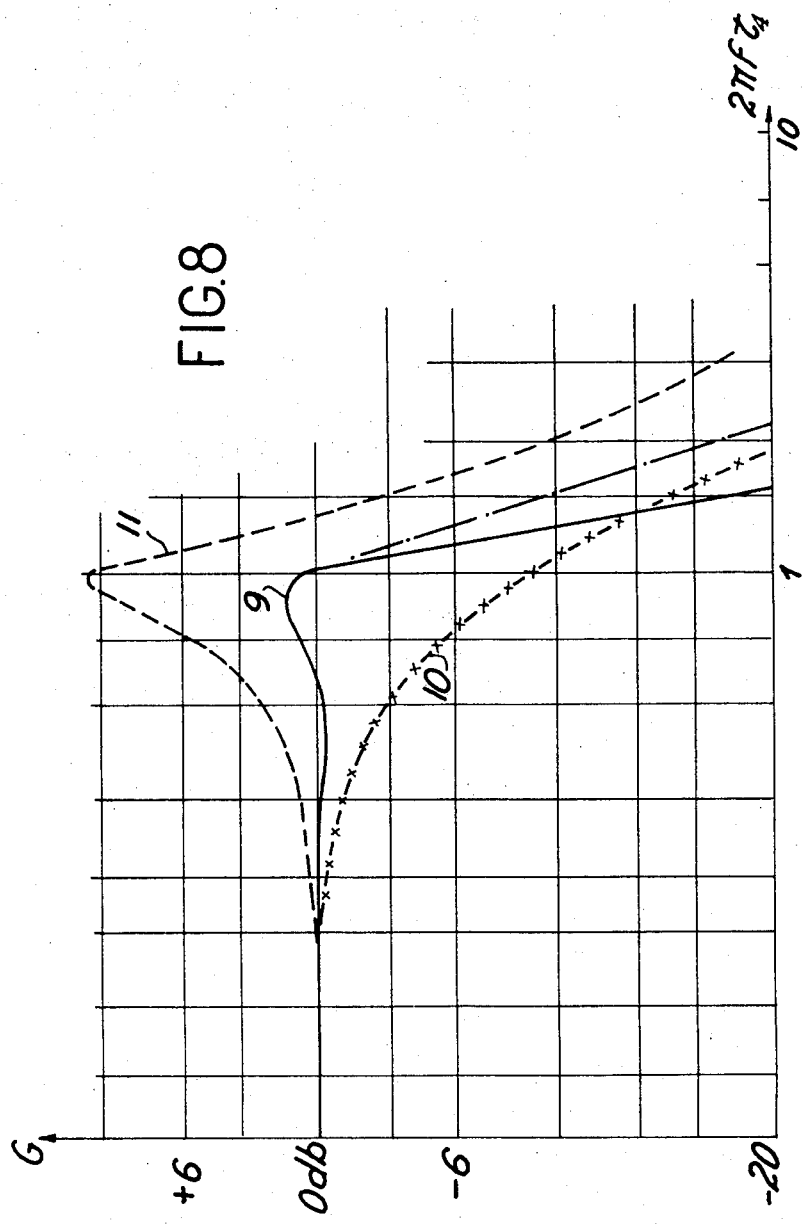
FIG. 8 is a set of decibel gain curves plotted vs. a parameter related to frequency, corresponding to the components of the low-pass filter in FIG. 6 and for the whole filter.

$\beta = R_8/R_8 + R_9$
$\rho_2 = R_9 \beta$
$\tau_4 = (R_4 = 2\rho) R_4 C_4^2$
$\tau_5 = \rho C_4$
$2\xi\tau_4 = (\rho + 3 R_4 - \beta G_o R_4) \cdot C_4$ Referring to FIG. 8, there is shown the absolute gain curve 9, plotted vs the frequency $f$ (or more exactly vs. the parameter $2 \pi f\tau_4$) of a filter of the aforementioned kind. Curve 10 represents the gain of the RC cells and curve 11 represents the gain of the active filter.

The expression $1 + 2\xi\tau_4 p + \tau_4^2 p^2$ in the denominator of the transfer function contains the parameter $\xi$ which determines the value of the gain at the resonance, the time constant $t_4$ which determines the resonance frequency and the slope after the resonance, provided that the other time constants are correctly selected. These resonance parameters can be adjusted with a potentiometer P which adjusts $\beta$.

In the embodiment under consideration $\xi = 0.16, 2 \pi f_B = 1.04$ $\tau_1 = \tau_2 = \tau_3 = 0.98 \tau_4 \ \tau_5 = 0.2 \tau_4$ In this case, the transfer function of the low-pass filter is:

$$g_B(p) = G_0 \cdot \frac{1 + 0.21 \frac{p}{2\pi f_B}}{\left(1 + 1.02 \frac{p}{2\pi f_B}\right)^3 \left(1 + 0.333 \frac{p}{2\pi f_B} + \frac{p^2}{4\pi^2 f_B^2}\right)}$$

The transfer function of the high-pass filter, using the same notation as for the low-pass filter, can be calculated as:

$g_H(p) = G'_o [\tau'1\ \tau'2\ \tau'3\ \tau'^2_4 p^5/(1+\tau'_1 p)(1+\tau'_2 p)(1+\tau'_3 p)(1+2\xi\tau'_4 p + \tau'^2_4 p^2)]$ In the present embodiment, we put $\tau'_1 = \tau'_2 = \tau'_3$ 12 The choice of the time constants $\tau'$ is based on the fact that it is necessary to obtain a pass-pand filter having a gain curve which, when drawn in dependence on the logarithm of the frequency, is symmetrical with respect to a vertical axis; the curve $|g_H|$ must therefore be symmetrical with the curve $|g_B|$ with respect to an axis $\omega = 2\pi f = \Omega$, $\Omega$ being the central pulsation $\omega_i$ of the filter $i$ having a band width $2\Delta\omega_i$. If the pulsation is written as $\omega = x \cdot \Omega$, its symmetrical function with respect to the straight line $\omega = \Omega$ will be $\omega' = 1\Omega/x$ and the condition of symmetry will therefore be written as $|g_H(\omega')| = |g_B(\omega)|$ whatever $\omega$.

The transfer coefficients will therefore be:

$$g_H(\omega') = G'_0 \frac{j}{\left(j + \frac{x}{\tau'_1 \Omega}\right)^3 \left(-1 + 2j\xi' \frac{x}{\tau'_4 \Omega} + \frac{x^2}{\tau'^2_4 \Omega^2}\right)}$$

and $$g_B(\omega) = G_0 \frac{1}{(1 + J\tau_1 x\Omega)^3 (1 + 2j\xi\tau_4 x\Omega - \tau_4^2 x^2 \Omega^2)}$$

In the last expression, we have neglected the term $1 + \tau_5 p$ in the numerator, since this term occurs only when remote from $f_B$. In the present embodiment, the transfer function of the high-pass filter can be calculated a follows from the condition of symmetry and the expression given hereinbefore:

$$g_H(p) = G'_0 \frac{0.865 \left(\frac{p}{\omega H}\right)^5}{\left(1+0.98\frac{p}{\omega_H}\right)^3 \left(1+0.307\frac{p}{\omega_H}+0.92\frac{p^2}{\omega_H^2}\right)}$$

with $\omega_H = \Omega^2/\omega_B$

Finally, the complex gain of the filter will be of the form $$T_1(f) = \alpha_1 \frac{\left(\frac{f}{f_1}\right)^5}{\left(1+a\frac{f}{f_1}\right)^3 \left(1+b\frac{f}{f_1}\right)^5 \left(1+2a\xi\frac{f}{f_1}+a^2\frac{f^2}{f_1^2}\right) \left(1+2b\xi\frac{f}{f_1}+b^2\frac{f^2}{f_1^2}\right)}$$

Figure 9:
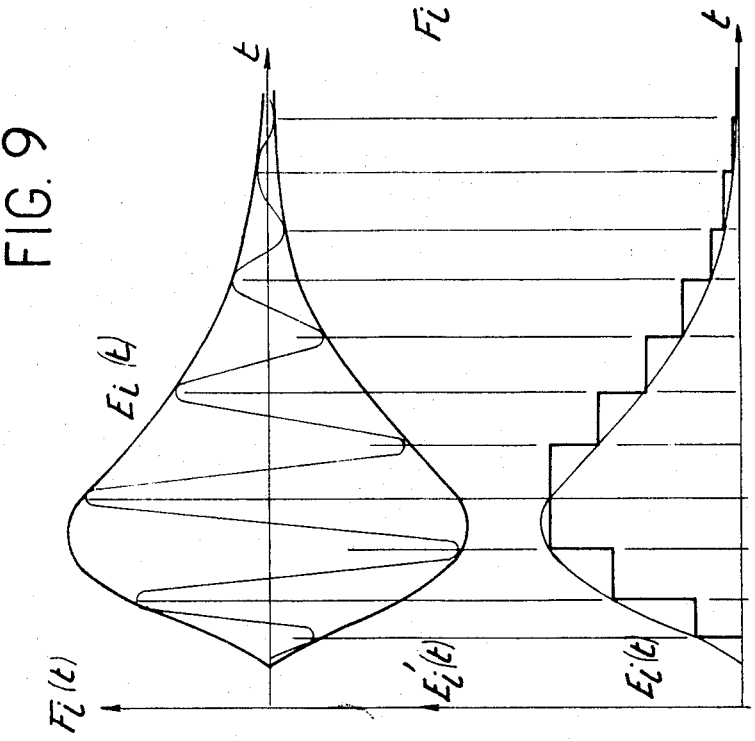
FIG. 9 shows a curve $F_i(t)$ and its envelope $E_i(t)$ and a curve $E'_i(t)$ obtained by the stage shown in FIG. 10.

FIG. 9 illustrates a general and preferred method of detecting the envelopes $E_i(t)$ of the function $f_i(t)$; this method is not conventional since the pseudo-period of $F_i(t)$ is large with respect to its duration. The method consists in rectifying $F_i(t)$ and then obtaining a stepped signal, each step of which has a height equal to a maximum of the aforementioned rectified signal, which begins at the instant when the maximum appears and terminates at the next maximum.

Figure 10:
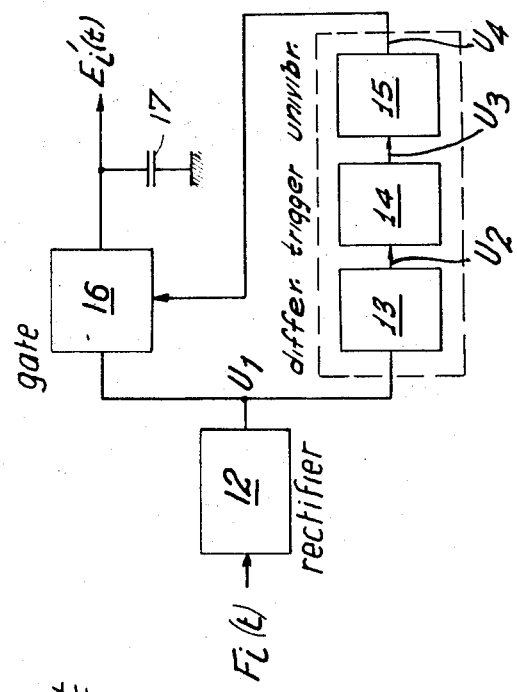
FIG. 10 is a block diagram in the form of functional sub-units of an envelope detection stage using double half-wave rectification.

FIG. 10 shows an embodiment of an assembly for working the method, and FIG. 11 illustrates the operation thereof.

The successive steps of the detection of envelopes are as follows:

Rectification $U_1(t) = |F_i(t)|$ in the double half-wave rectification unit 12 receiving $F_i(t)$ and outputting $U_1$;

Differentiation $U_2(t) = dU_1(t)/dt$ in the differentiation unit 13 receiving $U_1$ and outputting $U_2$;

Rectangular pulse shaping $U_3(t) = V_o \cdot \text{sign}[U_2(t)]$ in a trigger circuit 14 receiving $U_2$ and outputting $U_3$.

The rectangular signal $U_3(t)$, when applied to the input of a univibrator 15, produces pulses $U_4(t)$ of predetermined length and beginning at the descending fronts of $U_3(t)$, i.e., at the instant when $F_i(t)$ has an extreme value; the pulses $U_4(t)$ open a linear gate 16 for a given time during which a capacitor 17 is charged at a voltage $E'_1(t)$ which is a maximum of $|F_i(t)|/|E'_i(t)|$, that is $|(F_1)t|$ max.

The rectification of $F_i(t)$, which should be double half-wave, rectifies signals having an amplitude varying between 20 mV and 4 volts and delivers an output signal $U_1(t)$ with respect to earth.

Figure 12:
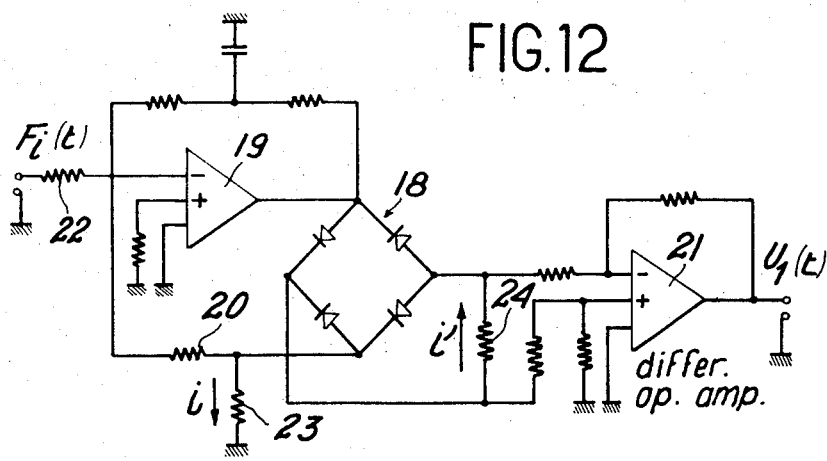
FIG. 12 shows a preferred embodiment of the double half-wave rectification assembly in FIG. 10.

The rectification circuit shown in FIG. 12 is preferably used. It comprises a four-diode bridge 18, a differential operational amplifier 19, a resistor 20 of value $R_{10}$ providing a current counter feed-back and a differential operational amplifier 21 at the output. The signal $F_i(t)$ is applied to amplifier 19 across a resistor 23 of value $R_{11}$; a current $a$ flows through a resistor 23 of value $R_{12}$, and a current $i'$ flows through a resistor 24 of value $R_{13}$.

Since the gains of amplifiers 19 and 21 are very large, we have the relations:

$$i = -(R_{10}/R_{11} \cdot R_{12}) F_i(t)$$

$$U_1 = R_{13} \cdot i'$$

so that $$U_1 = R_{13} (R_{10}/R_{11} \cdot R_{12}) |F_i(t)|$$

It is merely necessary therefore to put $R_{13} R_{10} = R_{11} R_{12}$ in order to obtain $U_1(t) = |F_i(t)|$ $U_1(t)$ may be differentiated in known manner by using an operational amplifier, a negative feed-back resistor and a capacitor. For shaping $U_2(t)$, there is provided an operational amplifier with regenerative feed-back and operating at its saturation voltages $U_3(t) = \pm V_o$ for providing rectangular pulses. THe univibrator delivering pulses $U_4(t)$ may be conventional.

Figure 13:
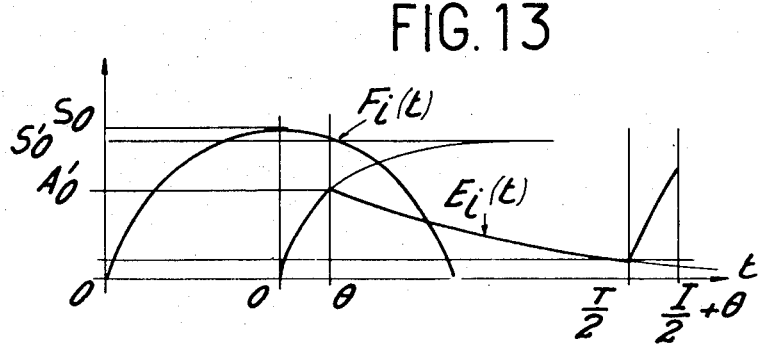
FIG. 13 shows a half-wave of $F_i(t)$ and a step of $E_i(t)$.

FIG. 13 shows a half-wave of $F_i(t)$ and a step of the signal $E'_i(t)$. In FIG. 13, $\theta$ is the duration of opening of the gate, $S_o$ is an extreme value of $F_i(t)$ to be stored by capacitor 17, $S'_o$ is the value of $F_i(t)$ at the end of a time $\theta$ after $F_i(t)$ has reached the value $S_o$, $A'_o$ is the voltage at which the capacitor 17 is charged at the end of the same time, and $a'_o$ is the voltage of the capacitor charge at the instant when the first extreme value of $F_i(t)$ appears after $S_o$, i.e. after the time $T/2$, $T$ being the pseudo-period of $F_i(t)$; we thus obtain the relations:

$$S'_o = S_o \cos 2\theta/T$$

$$A'_o = S'_o[1 - e^{-\theta/\tau}] \text{ where } \tau = \rho \cdot c$$

$\rho$ is the sum of the output resistance $\rho_1$ of amplifier $A_2$ (FIG. 12) and the transfer resistance $\rho_2$ of the open gate. $a'_o = A'_o \exp(-T/2 - \theta/a\tau)$ where $a\tau = P_o \cdot c$ $P_o$ is the total leakage resistance into which the capacitor discharges.

$$1/P_o = 1/P_1 + 1/P_2 + 1/P_3$$

$P_1$ is the leakage resistance of the closed gate, $P_2$ is the leakage resistance of capacitor 17 and $P_3$ is the input impedance of the output stage.

Finally, $$a'_o = S_o \cos 2\pi\theta/T (1-e^{-\theta/\tau}) \cdot e^{-T/2 - \theta/a\tau}$$

It follows that the time $\theta$ during which the gate is open must be short, i.e., $\theta << T/2$; the capacitor must be charged quickly i.e., $\tau << \theta$, and the capacitor must also be slowly discharged, i.e. $a\tau >> T/2$. We therefore have:

$$a'_o \approx S_o[1 - \frac{1}{2}(2\pi\theta)/T)^2][1-e^{-\theta/\tau}][1 - T/2a\tau]$$

i.e., $a'_o/S_o \approx 1 - \frac{1}{2}(2\pi\theta)/T^2 - e^{-\theta/\tau} - T/2a\tau$ The maximum relative error with regard to $E'_i(t)$ is:

$$\epsilon = S_o - a'_o/S_o \approx 2\pi y^2 + x/2a + e^{-xy}$$

If we put $x = T/t$ and $y = \theta/T$.

The foregoing reasoning shows, firstly, that the error $\epsilon$ may be very small if $a$, $x$ and $y$ are suitably selected; in the embodiment of the invention we obtained: $a = 10^6$, $x = 3,000$, $y = 0.005$, i.e., $\epsilon = 0.35$ percent. Secondly they enable to make a suitable selection of the gate, of the output stage and of the capacitor 17.

The gate may be a simple relay. The output stage C' is an impedance matcher which should have a very large input resistance and a not excessive output impedance; a conventional FET circuit may be used. The capacitor 17 should have a large insulation resistance. A "Mylar" capacitor is suitable.

Figure 15:
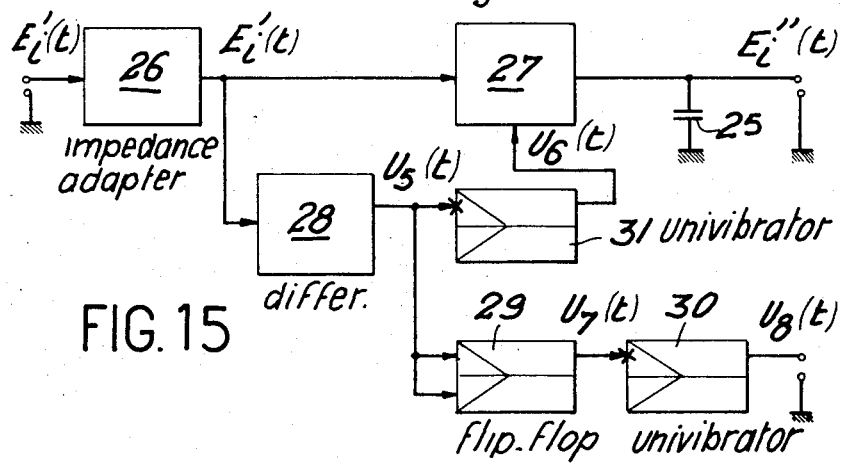
FIG. 15 is a block diagram of a stage for detecting the maxima $V_i$.
Figure 14:
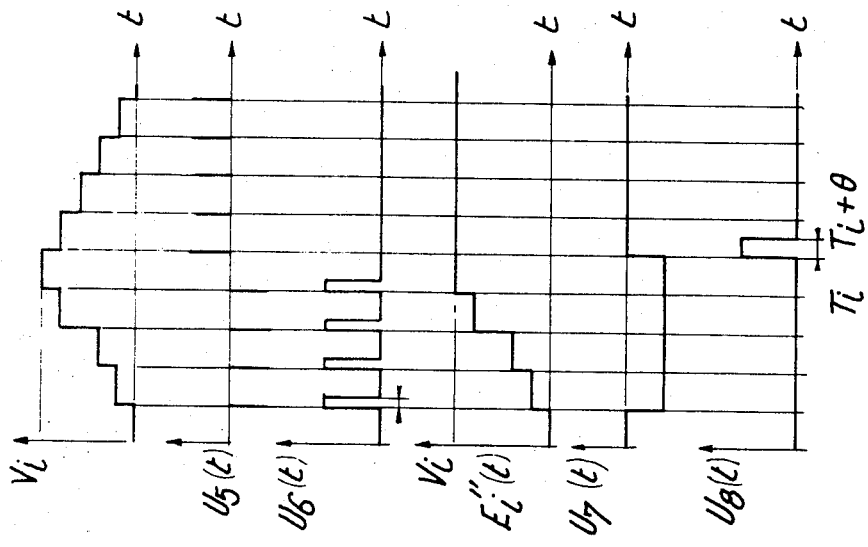
FIG. 14 shows a method of obtaining the maxima $V_i$ and showing the signals obtained by means of a stage for detecting the maxima $V_i$ of the envelopes $E_i(t)$, the stage being that shown in FIG. 15.

FIG. 14 illustrates a method of obtaining the maxima $V_i$ of the envelopes $E'_i(t)$, and FIG. 15 is a block diagram of the corresponding circuit.

Basically, the method consists in charging a storage capacitor 25 with the signal $E'_i(t)$ in a circuit such that the capacitor cannot discharge as sonn as $E'_i(t)$ has reached its maximum $V_i$.

It is also necessary to known when $E'_i(t)$ has reached its maximum $V_i$; to this end a pulse $I_i$ is generated at the instant when the first negative front of $E'_i(t)$ appears.

The first operation is performed by differentiating $E'_i(t)$, thus obtaining a pulse train $U_5(t)$. In this train, the pulses corresponding to the postive fronts of $E'_i(t)$ trigger a monostable which delivers pulses $U_6(t)$ of calibrated duration $\theta'$; the aforementioned pulses $U_6(t)$ open a gate across which the capacitor is charged during the time $\theta'$.

The second operation is performed by using pulses $U_5(t)$ to actuate a bistable or flip-flop supplying a rectangular signal $U_7(t)$, and the front of $U_7(t)$ corresponding to the first negative front of $E'_i(t)$ triggers a monostable delivering a signal which is a pulse $I_i$ of duration $\theta''$.

Referring to FIG. 15, an impedance matching unit 26 feeds a gate 27 and a differentiation unit 28. Unit 28 feeds a bistable 29 followed by a monostable 30 and feeds a univibrator 31 which supplies pulses $U_6(t)$ to a gate 27 whose output is connected to capacitor 25.

The impedance matcher 26 shown in FIG. 15 serves merely to separate the aforementioned $V_i$ detection stage from the preceding stage. The impedance matcher 26 should have a large input impedance and a low output impedance; this is achieved in known manner by using a negative-feedback operational amplifier. Use may be made of a "Mylar" capacitor 25 and of a gate 27 consisting of a relay.

The differentiation unit 28 may be a resistor-capacitor network, in which case the differentiated signal must be amplified, for instance by a conventional transistor circuit having a negative gain.

The two univibrators 30 and 31 and the flip-flop 29 are conventional; however the univibrator 31 actuating relay 27 should respond to negative pulses whereas the univibrator 30 delivering the pulse $I_i$ is triggered by positive pulses.

Figure 16:
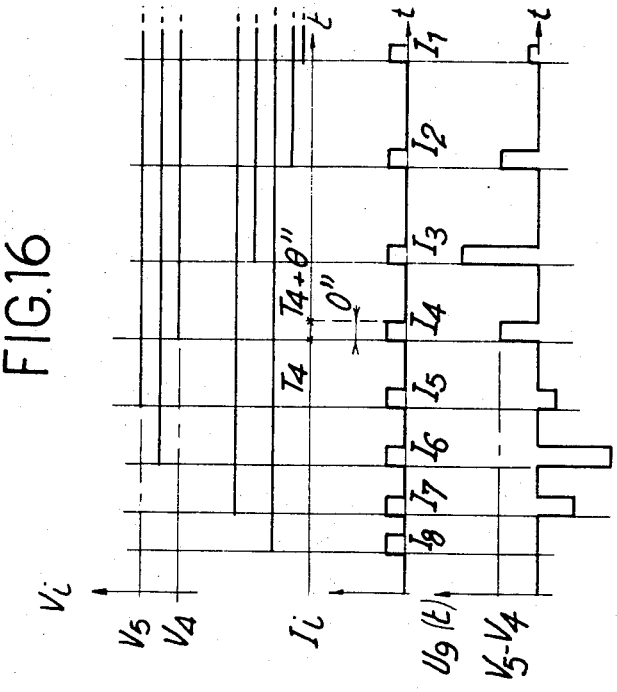
FIG. 16 illustrates a method of obtaining the final result by indicating the signals delivered by the stage shown in FIG. 17.

Referring to FIG. 16, there is illustrated a method of obtaining the final "yet" or "no" indication. The indication should be "yes" if the largest $V_i$ is at a frequency $f_M$ in the relevant interval (0.037 − 0.47 cps in the embodiment under consideration). In the other cases, the indication should be "no". We thus obtain "yes" if $[V_i]$ max $= V_a$, with $2 \leq a \leq 7$: The method therefore consists in comparing $V_i$ with $V_{i-1}$, proceeding from 2 to 8.

If $V_i - V_{i-1} < 0$, then $f_M < f_i - \Delta f_i$

If $V_i - V_{i-1} > 0$, then $f_M \geq f_i - \Delta f_i$

If therefore we obtain $V_a - V_{a-1} > 0$, and if $V_{a+1} - V_a < 0$,

We conclude that:

$$f_a - \Delta f_a \leq f_M < f_{a+1} - \Delta f_{a+1}$$

i.e., $f_M$ is in the pass-band of the filter of rank $a$; it is therefore sufficient to detect the transition from a negative difference $V_i - V_{i-1}$ to a positive difference $V_i - V_{i-1}$.

To this end, knowing that $V_i$ exists from the instant $T_i$ when pulse $I_i$ appears and that the aforementioned pulses appear successively from $I_8$ to $I_1$, a signal $U_9(t)$ is produced comprising a train of pulses each of which begins at the same instant $T_i$ as each of the pulses $I_i$ and has the same duration $\theta''$, the pulse corresponding to pulse $I_i$ having the value $V_{i+1} - V_i$; if the transition from a negative pulse $U_9(t)$ to a positive pulse $U_9(t)$ occurs in a time $t$ in the interval $T_{a+1} + \theta''$, $T_a + \theta''$ with $2 \leq a \leq 7$, the apparatus displays the indication "yes".

The aforementioned method, however, may be unsatisfactory if more than one signal appears at the input. If for example, the frequency $f_M$ of the spectrum of a first signal is less than 0.037 cps, all the pulses obtained are negative, and if the frequency $f_M$ of the spectrum of the next signal is greater than 0.47 cps, all the corresponding pulses are positive, and a transition from a negative to a positive pulse occurs without a relative signal being present.

To this end, the separation time of the pulses $U_9(t)$ is used in addition to their sign. This method is based on the following empirical consideration. Experience shows that the first negative front of the envelop $E'_i(t)$ of the response of the filter of rank $i$ corresponds to the half-wave of rank 3 to 6 of the same response $F_i(t)$; the maximum time interval between $T_i$ and $T_{i+1}$ is then:

$$\Delta T_{i+1} = 6/2 f_i - 3/2 f_{iH}$$

Now $$f_i = 2Q-1/2Q+1 \, f_{i+1} = 2/3 \, f_{iH} \text{, since } Q = 2.5;$$

Therefore, $$(T_i - T_{i+1}) \max = \Delta T_{i+1} - 3/f_{i+1}$$

Figure 17:
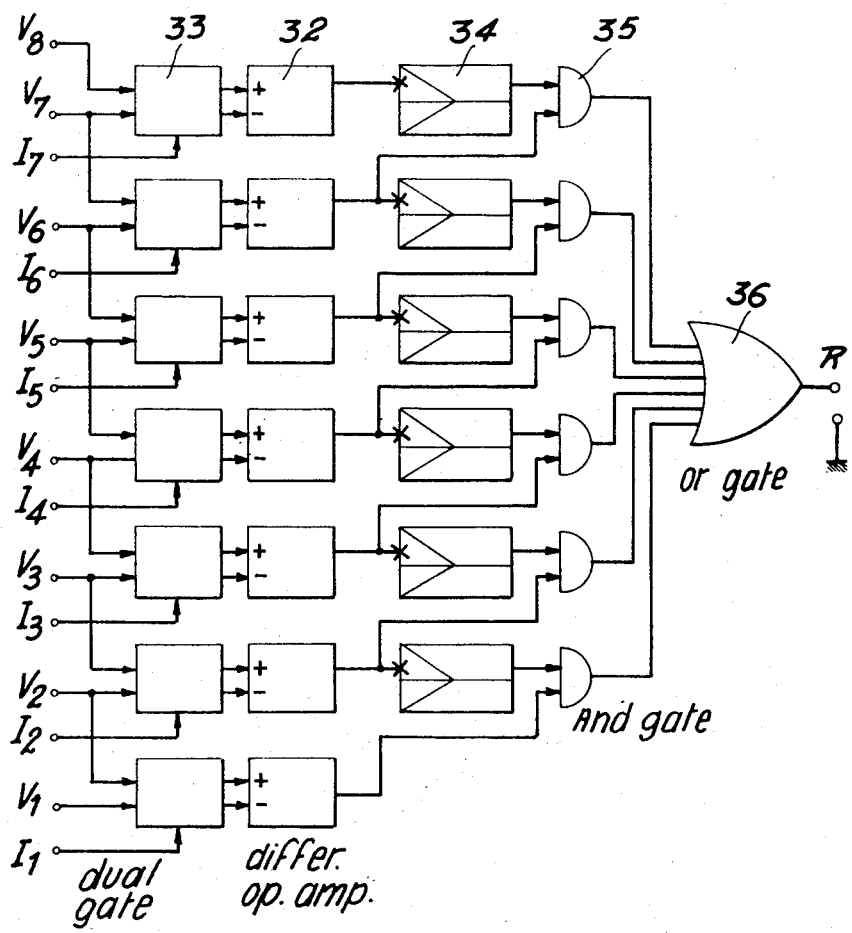
FIG. 17 is a block diagram, in the form of functional sub-units, of the final decision stage (which shows whether the signal is relevant or not)

The apparatus should therefore indicate "yes" if a transition from a negative to a positive pulse occurs during the train $U_9(t)$ and if in addition these two pulses are not separated by a time greater than $\Delta T_{i+1} = 3/f_{i+1}$ FIg. 17 shows an embodiment of the final stage in accordance with the method illustrated in FIG. 16: The differences $V_{i+1} - V_i$ are obtained by seven differential amplifiers 32 preceded by seven double gates 33 actuated by the pulses $I_i$ ($i = 1$ to 7) connecting $V_{i+1}$ to the positive input and $V_i$ to its negative input of the amplifier of rank $i$.

The output of each amplifier of rank $i$ (with $i$ between 2 and 7) is connected to a univibrator 34 of reset time $\Delta T_i$ triggered by a negative pulse. An AND gate such as 35 subsequently compares the duration with the time interval separating $I_i$ from $I_{i-1}$.

A six-input OR gate is connected to the outputs of six AND gates. Consequently, a "yes" indication by the device is in the form of a positive pulse at the output of the OR gate 36.

The differential amplifiers 32 are preferably operational amplifiers and the double gates 33 are relays having a low response time.

Figure 18:
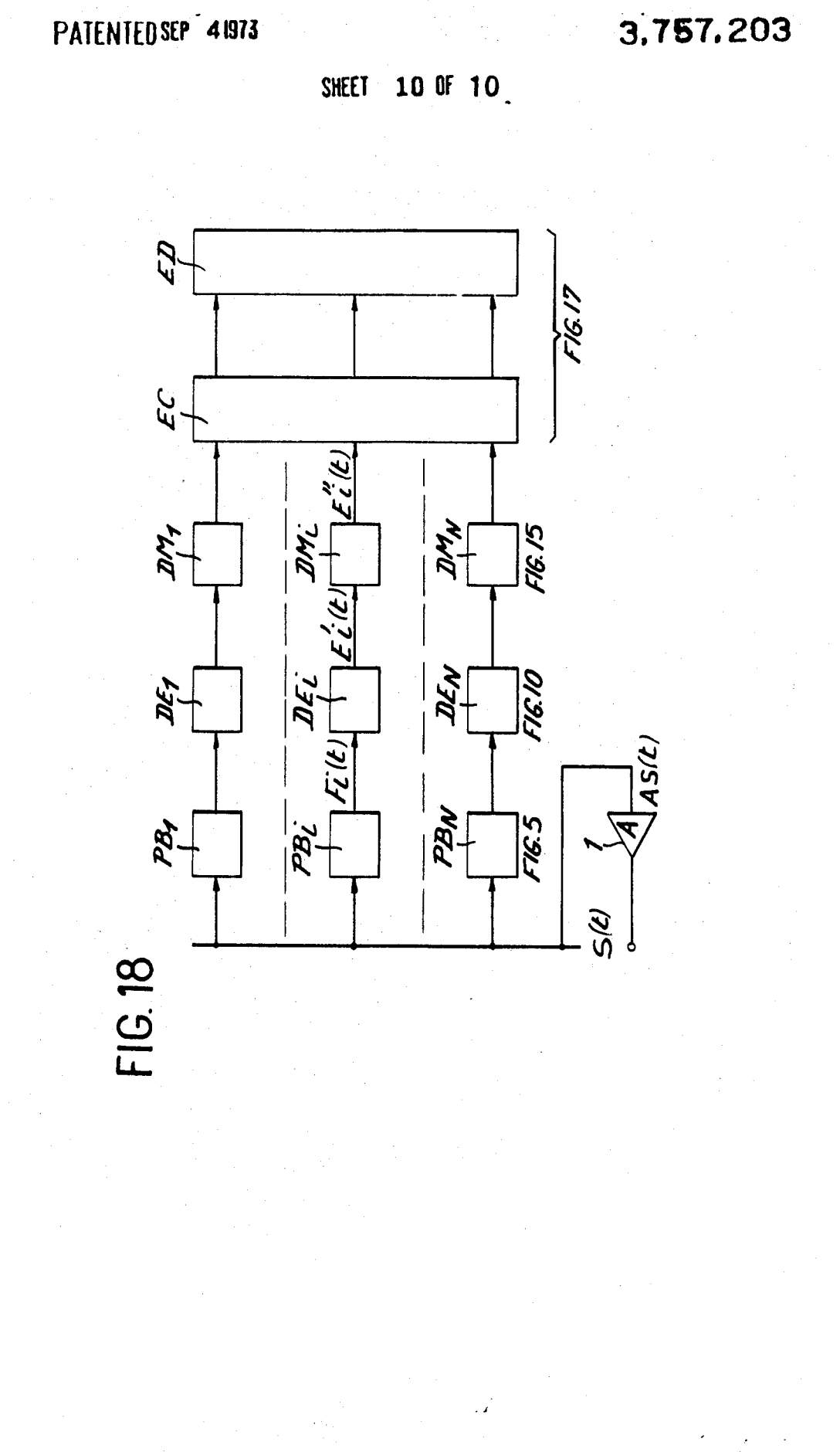

FIG. 18 is a block diagram of the arrangement of the various units disclosed in FIGS. 5, 10, 15 and 17 to form a complete electronic system according to the invention.

FIG. 18 shows the amplifier 1 of gain A from FIG. 5 the output AS($t$) of which supplies in parallel the N band-pass filters $PB_1, \ldots PB_i, \ldots PBhd N$, one of which (PB$_i$) has also been illustrated in FIG. 5. The N filters each feed a respective one of N envelope detection stages DE$_1$, ... DE$_i$, ... DE$_N$ of the kind illustrated in FIG. 10. The N envelope detection stages deliver their output each in one of the N maxima detection stages DM$_1$, ... DM$_i$, ... DM$_N$ of the kind illustrated in FIG. 15.

Finally, all maxima detection stages feed a stage for comparing the aforementioned maxima EC, followed by a decision stage ED, the unit formed by stages EC and ED being illustrated in FIG. 17.

It is clear from the above that the invention provides a system for indication of the presence of wrecks and sub-marines which is simple and rugged in design and of light weight. Such system is particularly suitable for the detection of sub-marines with a magnetometer towed by an helicopter whose pay load is insufficient to permit use of an on line computer for spectrum analysis. The magnetometer may preferably be a proton magnetometer, but an optical pumping magnetometer may also be used. It is also of interest to note that an indication as to the length and displacment of the wreck or sub is obtained, since the filter which provides the maximum output depends upon the length.

We claim:

1. A system for processing the signal delivered by a differential magnetometer displaced by an aircraft along a level path and for detecting and indicating the presence of an immersed magnetic body, comprising:

N stages connected in parallel to the output of said magnetometer, N being a predetermined integer greater than one, each of said N stages comprising in series: band pass filter means, first means coupled to said band pass filter means for detecting the envelope of the signals provided by said band pass filter, and second means coupled to said first means for detecting the maximum of said envelope;

said band pass filter means of said N stages operating to divide a predetermined frequency band $f_o - f'_o$ into sub-bands selected as a function of the altitude of said magnetometer and of the horizontal speed thereof;

means coupled at the output of said N stages for comparing the maximum of said envelope as detected by said second means of each of said N stages and for indicating which maximum is the greatest; and decision means responsive to the occurence of the greatest maximum at a predetermined subrange in the band $f_o - f'_o$ for indicating the likelihood of the presence of an underwater body 2. A system ccording to claim 1, wherein all filters have the same ratio between their central frequency and their bandwidth.

3. A system according to claim 1, wherein the frequency bands of the filters are adjacent, the first filter covering a range of frequencies below $f_o$ and having an upper band limit equal to $f_o$, and the same filter covering a range of frequencies higher than $f'_o$ and having a lower limit equal to $f'_o$.

4. A system according to claim 3, wherein an aeroplane flies the magnetometer at a speed of about 100 meters per second and at an altitude between 100 and 400 metres, the frequency $f_o$ is 0.037 cps., the frequency $f'_o$ is 0.47 cps the filters have a sharpness of 2.5, and the number of filters is 8.

5. A system according to claim 1, wherein each band-pass filter consists of a low-pass filter and a high-pass filter in series, each of said low-pass and high-pass filters comprising RC cells in series connected by impedance matching means to a high-gain DC amplifier having a RC reaction loop providing a square gain curve.

6. A device according to claim 1, wherein each stage for detecting the envelope of the signals from each filter comprises a double wave rectifier unit, a differentiating unit, energized by said differentiating unit a trigger circuit a monovibrator controlled by said trigger and delivering opening pulses to a gate which charges a capacitor during the time when the gate is open as a result of signals supplied by the rectifier unit.

7. A system according to claim 1, wherein each stage for detecting the maxima $V_i$ of the envelopes comprises an impedance matching unit fed by said unit, a gate differentiating means fed by said unit and which supplies opening pulses to a gate and actuates a flip flop, a monostable triggered by said flip flop and which delivers a pulse indicating the instant when the maximum is obtained, said gate when open enabling the signals delivered by the impedance matching unit to load a capacitor.

8. A system according toclaim 1, wherein the maxima-comparing and decision stage consists of $(N - 1)$ double gates opened by pulses I$_i$ switching the maxima $V_i + 1$ and $V_i$ to the inputs of $(N-1)$ differential amplifiers outputting signals $V_{i+1} - V_i$ to $(N - 2)$ monostables, each monostable having a predetermined switching time and being triggered by a negative pulse, that amplifier which delivers the signal $V_2 - V_1$ not being followed by a monostable, each monostable outputting to a two input AND gate whose second input is supplied by the signals $V_{i-1} - V_i$, and each of the $(N-2)$ AND gates outputting to an $(N-2)$ OR gate which delivers a signal if the frequency $f_M$ is in the band $f_o - f'_o$.

* * * * *